United States Patent
Fujiwara et al.

(10) Patent No.: US 7,559,120 B2
(45) Date of Patent: Jul. 14, 2009

(54) VEHICLE OUTER HANDLE SYSTEM

(75) Inventors: Hiroto Fujiwara, Miyazaki (JP); Yuho Otsuta, Miyazaki (JP); Kyoutarou Yoshii, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 12/058,286

(22) Filed: Mar. 28, 2008

(65) Prior Publication Data

US 2008/0246293 A1 Oct. 9, 2008

(30) Foreign Application Priority Data

Mar. 30, 2007 (JP) .............................. 2007-090346

(51) Int. Cl.
*A45C 3/00* (2006.01)
(52) U.S. Cl. ................. 16/412; 340/426.28; 292/336.3; 296/1.02; 343/713
(58) Field of Classification Search .................. 16/412, 16/110.1; 340/426.28, 545.1, 541; 292/216, 292/336.3, 347, 348; 296/1.02; 343/713; 200/61.93, 61.85, 61.62
See application file for complete search history.

(56) References Cited

U.S. PATENT DOCUMENTS

| | | | |
|---|---|---|---|
| 6,527,316 B1* | 3/2003 | Agostini et al. ............. | 292/347 |
| 6,977,619 B2* | 12/2005 | March et al. ................. | 343/711 |
| 7,300,190 B2* | 11/2007 | Nitawaki et al. ............ | 362/501 |
| 2005/0236846 A1 | 10/2005 | Hidaka et al. | |
| 2006/0119524 A1* | 6/2006 | March et al. ................. | 343/713 |
| 2007/0115191 A1* | 5/2007 | Hashiguchi et al. ......... | 343/713 |
| 2008/0018127 A1* | 1/2008 | Schindler et al. ........... | 296/1.02 |

FOREIGN PATENT DOCUMENTS

| | | |
|---|---|---|
| DE | 102 12 794 A1 | 6/2003 |
| DE | 10 2004 038 569 B3 | 10/2005 |
| EP | 1 035 276 A2 | 9/2000 |
| EP | 1 291 480 A1 | 3/2003 |
| JP | 2004-169426 A | 6/2004 |

* cited by examiner

*Primary Examiner*—William L. Miller
(74) *Attorney, Agent, or Firm*—Arent Fox LLP.

(57) ABSTRACT

In a vehicle outer handle system including a circuit board which includes an electric part and which is contained in an operating handle, the operating handle is die-formed of a synthetic resin in such a manner that a protecting means covering the circuit board is mold-coupled to the operating handle. Thus, a special water-proofing counter measure is not required, leading to a reduction in number of operating steps and a reduction in number of parts. Further, the generation of an abnormal sound during operation of the operating handle is prevented.

2 Claims, 10 Drawing Sheets

VEHICLE OUTER HANDLE SYSTEM

BACKGROUND OF THE INVENTION

The present invention relates to a vehicle outer handle system comprising a circuit board including an electric part, the circuit board being accommodated in an operating handle.

DESCRIPTION OF THE RELATED ART

There is a vehicle outer handle system known from Japanese Patent Application Laid-open No. 2004-169426, in which an operating handle is comprised of a handle body having an accommodating recess in which a circuit board is accommodated and fixed, and a cover attached to the handle body, and the accommodating recess is filled with a potting agent in order to waterproof the circuit board as well as an electrical connection to the circuit board.

In an outer handle system in which an operating handle is of a structure divided into two components as in the outer handle system disclosed in the above Japanese Patent Application Laid-open No. 2004-169426, an operating for applying an adhesive to between the handle body and the cover or covering the circuit board with a potting agent is required in order to prevent rainwater or the like from entering into the operating handle through between division faces, resulting in an number of operating steps due to a water-proofing countermeasure. In addition, a screw member for coupling the handle body and the cover to each other is required, resulting in an increase in number of parts. Moreover, there is a possibility of an abnormal sound is generated from between the handle body and the cover during an operation of the operating handle.

SUMMARY OF THE INVENTION

Accordingly, it is an object of the present invention to provide a vehicle outer handle system, wherein the need for a special water-proofing countermeasure is eliminated to reduce the number of operating steps and to reduce the number of parts, and further, the generation of an abnormal sound during an operation of the operating handle is prevented.

In order to achieve the object, according to a first feature of the present invention, there is provided a vehicle outer handle system comprising a circuit board including an electric part and the circuit board being accommodated in an operating handle, wherein said operating handle is die-formed of a synthetic resin in such a manner that a protecting means covering said circuit board is mold-coupled to said operating handle.

According to a second feature of the present invention, in addition to the first feature, said protecting means comprises a holder to which said circuit board is fixed and whose outer surface opposite from a side on which said circuit board is fixed is a portion of an outer surface of said operating handle, and a holder cover attached to said holder to cover said circuit board, and an outer surface of said cover holder is formed into a streamline shape in a region opposed to the direction of flowing the resin during die-formation.

According to a third feature of the present invention, in addition to the first or second features, terminals electrically connected to said circuit board is embedded in said holder in such a manner that one end thereof protrudes from the outer surface of said operating handle after the die-formation of the operating handle.

With the first feature of the present invention, the operating handle is formed of a synthetic resin by die-formation in such a manner that the protecting means covering circuit board is mold-coupled to the operating handle. Therefore, as compared with the conventional operating handle which was of the structure divided into the handle body and the cover, it is unnecessary to take a water-proofing countermeasure such as the adhesion and the filling of the potting agent and thus, it is possible to reduce the number of operating steps. In addition, the screw member or the like for coupling the two members to each other is not required, and thus, it is also possible to reduce the number of parts. Further, the operating handle is of an integral structure and hence, there is no division face and thus, it is possible to prevent the generation of an abnormal sound. Moreover, the circuit board is covered with the protecting means and hence, a heat generated during die-formation using the synthetic resin cannot exert an adverse influence to the electric part and the circuit board.

With the second feature of the present invention, the holder cover of the protecting means faces a molten resin during die-formation using the synthetic resin, and the outer surface of the holder cover is formed into the streamline shape in the region opposed to the direction of flowing of the resin during the die-formation. Therefore, it is possible to smoothen the flowing of the molten resin to suppress a load applied to the protecting means to a smaller level, thereby preventing the deformation of the protecting means.

With the third feature of the present invention, terminals for electrically connecting the circuit board to the vehicle are embedded in the holder. Therefore, it is possible to facilitate the integral formation of the operating handle, while enabling the electrical connection to the vehicle, and it is possible to disuse a harness and a conductor wire to simplify the electrical connection to the vehicle.

The above and other objects, features and advantages of the invention will become apparent from the following description of the preferred embodiments taken in conjunction with the accompanying drawings.

BRIEF DESCRIPTION OF THE DRAWINGS

FIG. 1 is a perspective view of an operating handle;

FIG. 2 is a front view of the operating handle;

FIG. 3 is sectional view taken along a line 3-3 in FIG. 2;

FIG. 4 is sectional view taken along a line 4-4 in FIG. 2;

FIG. 5 is sectional view taken along a line 5-5 in FIG. 2;

FIG. 6 is a vertical sectional view showing an opened state of dies for die-formation of the operating handle;

FIG. 7 is a vertical sectional view similar to FIG. 6 but showing a state in which a molten resin has been injected;

FIG. 8 is a vertical sectional view similar to FIG. 6 but in a gas injecting state;

DESCRIPTION OF THE PREFERRED EMBODIMENTS

The present invention will now be described by way of embodiments with reference to the accompanying drawings.

Figure 1:
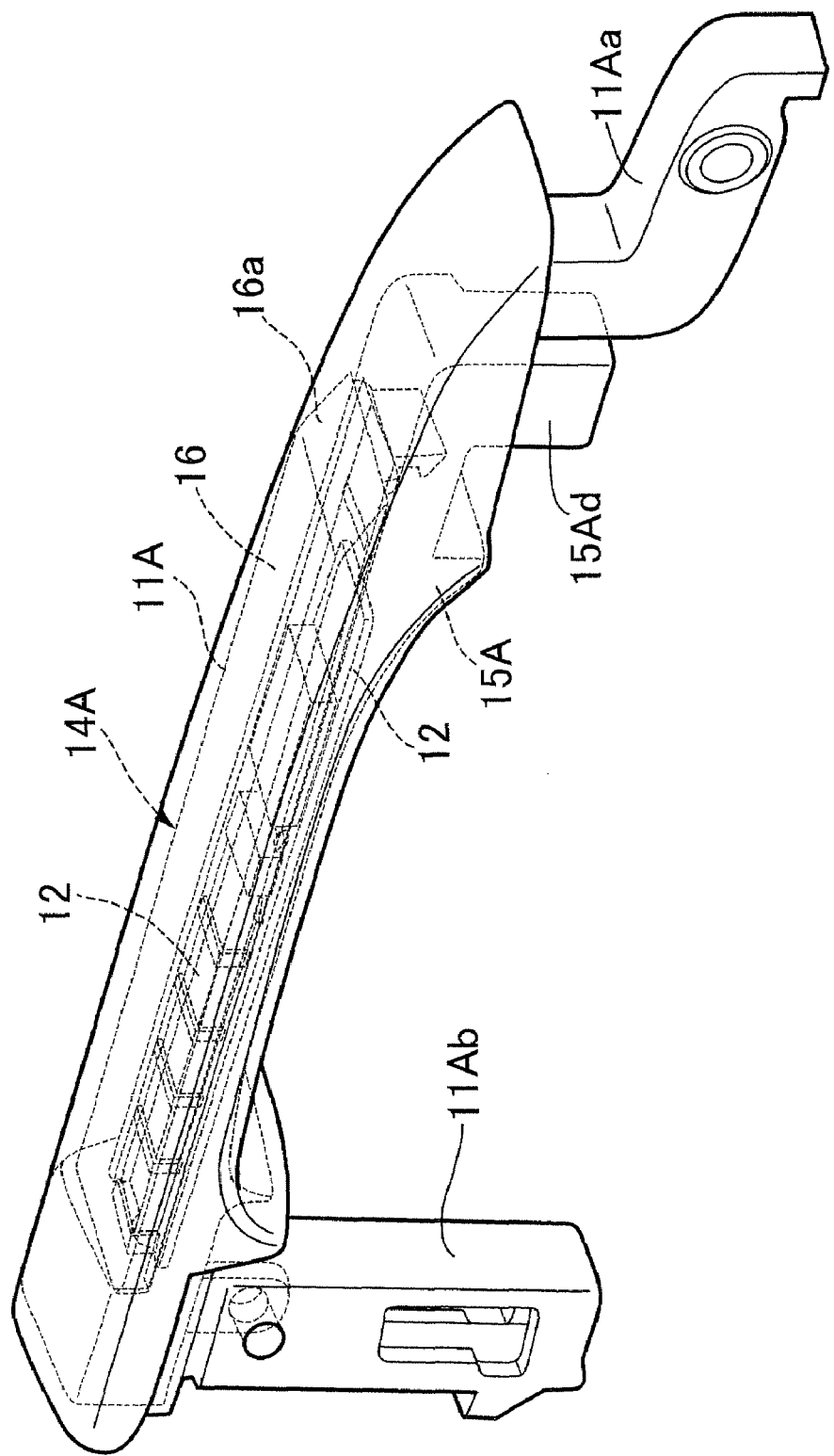
FIGS. 1 to 8 show the first embodiment of the present invention.
Figure 2:
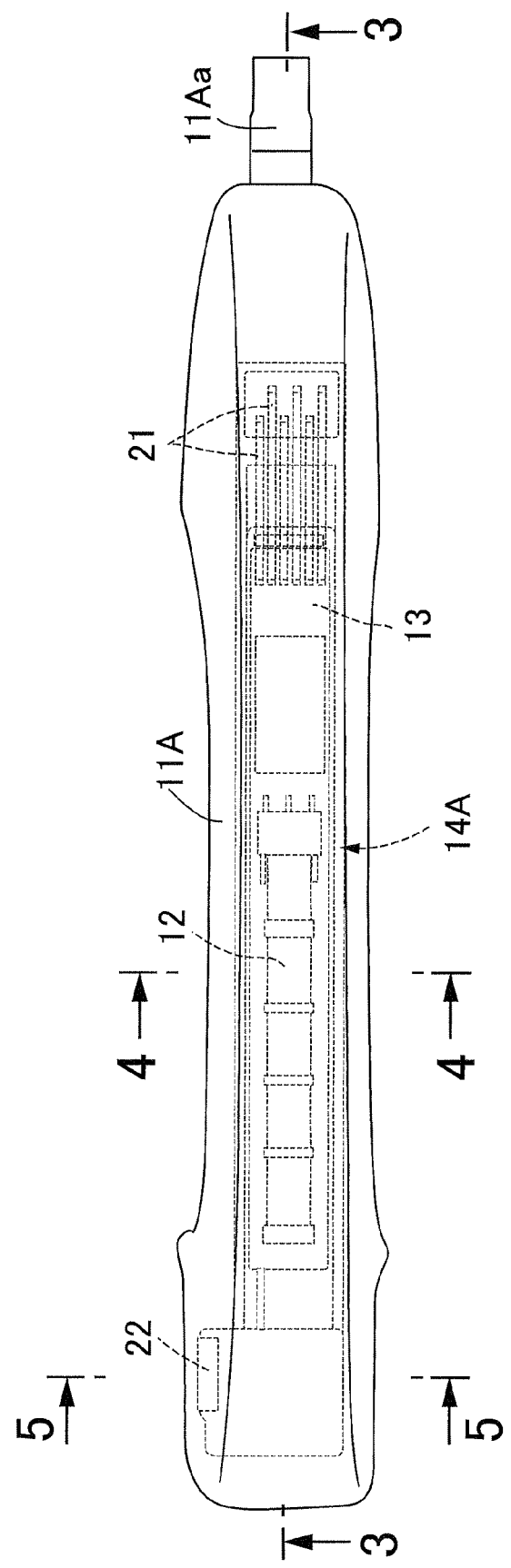
Figure 3:
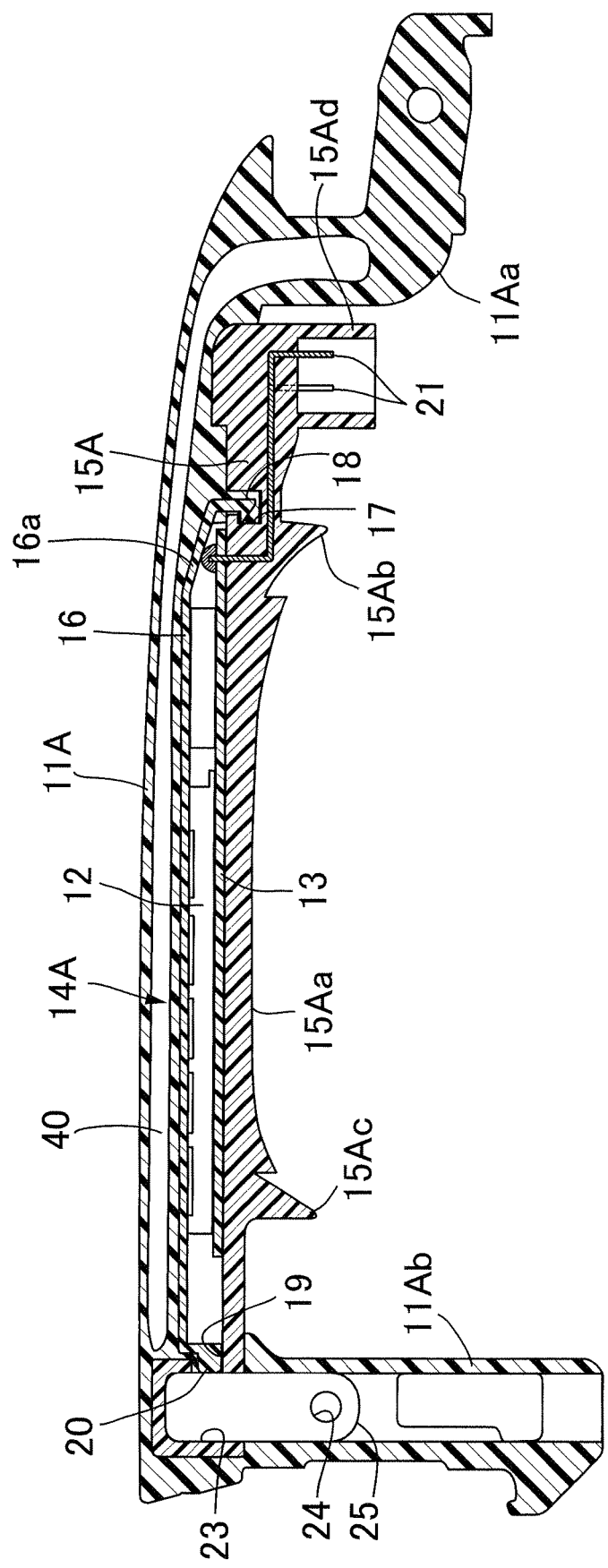

Referring first to FIGS. 1 to 3, an operating handle 11A disposed on an outer surface of a vehicular door to extend in a front-back direction of the vehicle (in a left and right direction in FIGS. 1 to 3). The operating handle 11A is integrally provided at its lengthwise opposite ends with a substantially L-shaped support arm portion 11Aa and an operating arm portion 11Ab. The support arm portion 11Aa is turnably supported on the vehicular door, and the operating arm portion 11Ab is connected to a latch mechanism which is not shown.

Figure 4:
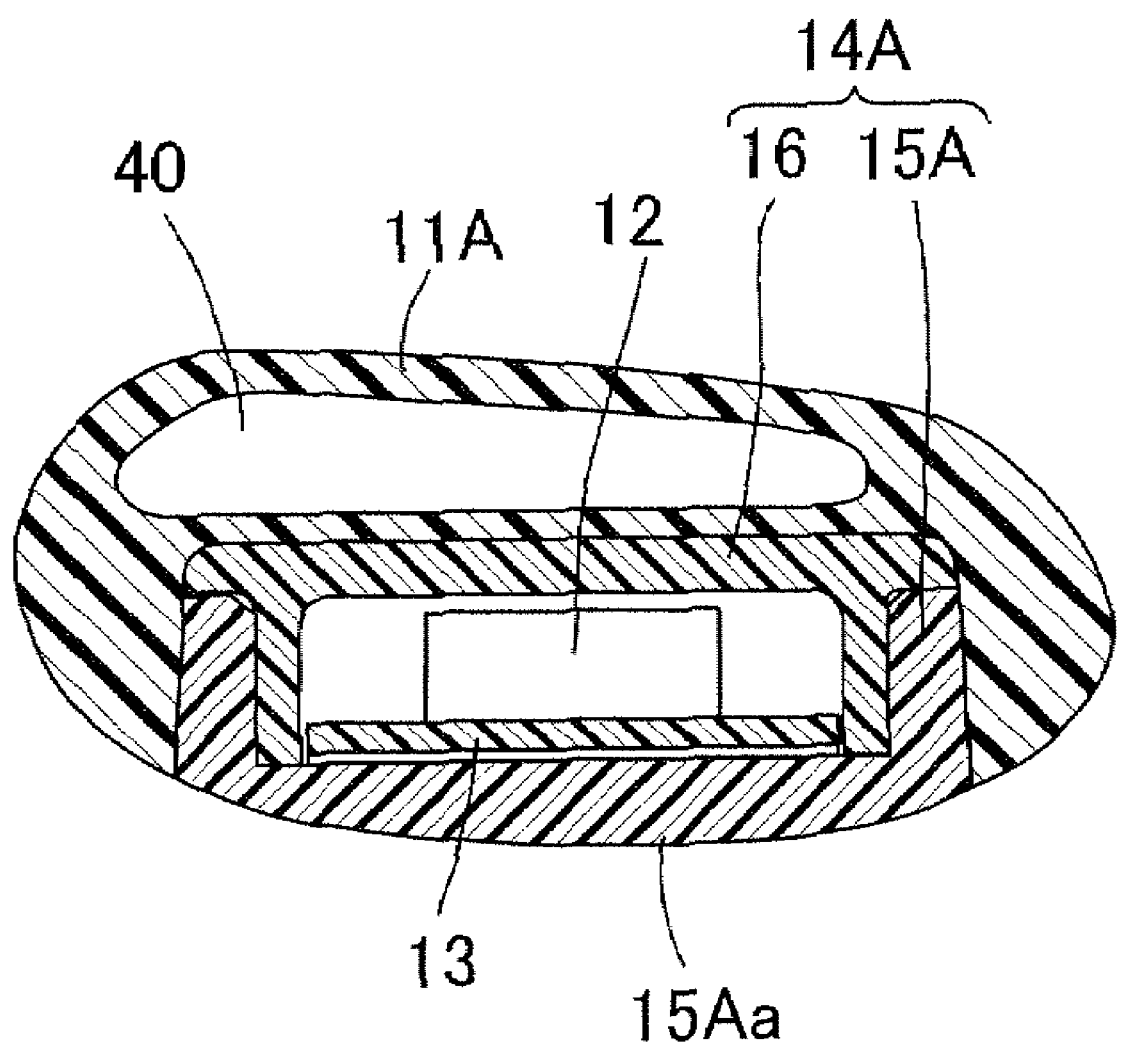

Referring also FIG. 4, a circuit board including electric parts is contained within the operating handle 11A. In this embodiment, a circuit board 13, which has an unlocking sensor (not shown) printed thereon for confirming an intension for unlocking the vehicular door by the access to or the contact with the operating handle 11A and which is provided with an antenna 12, is contained in the operating handle 11A.

The circuit board 13 is covered with a protecting means 14A, and the operating handle 11A is formed of a synthetic resin by die-formation in such a manner that the protecting means 14A is mold-coupled to the operating handle 11A. Moreover, the protecting means 14A comprises a holder 15A to which the circuit board 13 is fixed and whose outer surface opposite from a side on which the circuit board 13 is fixed is a portion of an outer surface of the operating handle 11A, and a holder cover 16 attached to the holder 15A to cover the circuit board 13.

The circuit board 13 is adhered to the holder 15A by a double-sided adhesive tape or the like, and the holder cover 16 is attached to the holder 15A by bringing an engagement claw 18 provided on the holder cover 16 into engagement with a locking recess 17 provided in the holder 15A and bringing an engagement claw 20 provided on the holder cover 16 into engagement with a locking bore 19 provided in the holder 15A in such a manner that the holder cover 16 covers the circuit board 13.

A grip portion 15Aa curved to permit a vehicle user to easily grasp its portion is formed on the holder 15A at a lengthwise central portion of the holder 15A to face the vehicular door side, and a pair of projections 15Ab and 15Ac are integrally provided on the holder 15A to sandwich the grip portion 15Aa from opposite sides.

A coupler portion 15Ad is integrally provided on the holder 15A between one 15Ab of the projections 15Ab and 15Ac and the support arm portion 11Aa to protrude toward the vehicular door, and a plurality of terminals 21 each having one end disposed at the coupler portion 15Ad are embedded in the holder 15A in such a manner that they are insert-formed during die-formation of the holder 15A. The terminals 21 protrude from a surface of the holder 15A facing the holder cover 16 at locations adjacent to the circuit board 13. Before the holder cover 16 is attached to the holder 15A, the terminals 21 are electrically connected to the circuit board 13 by soldering or the like.

Figure 5:
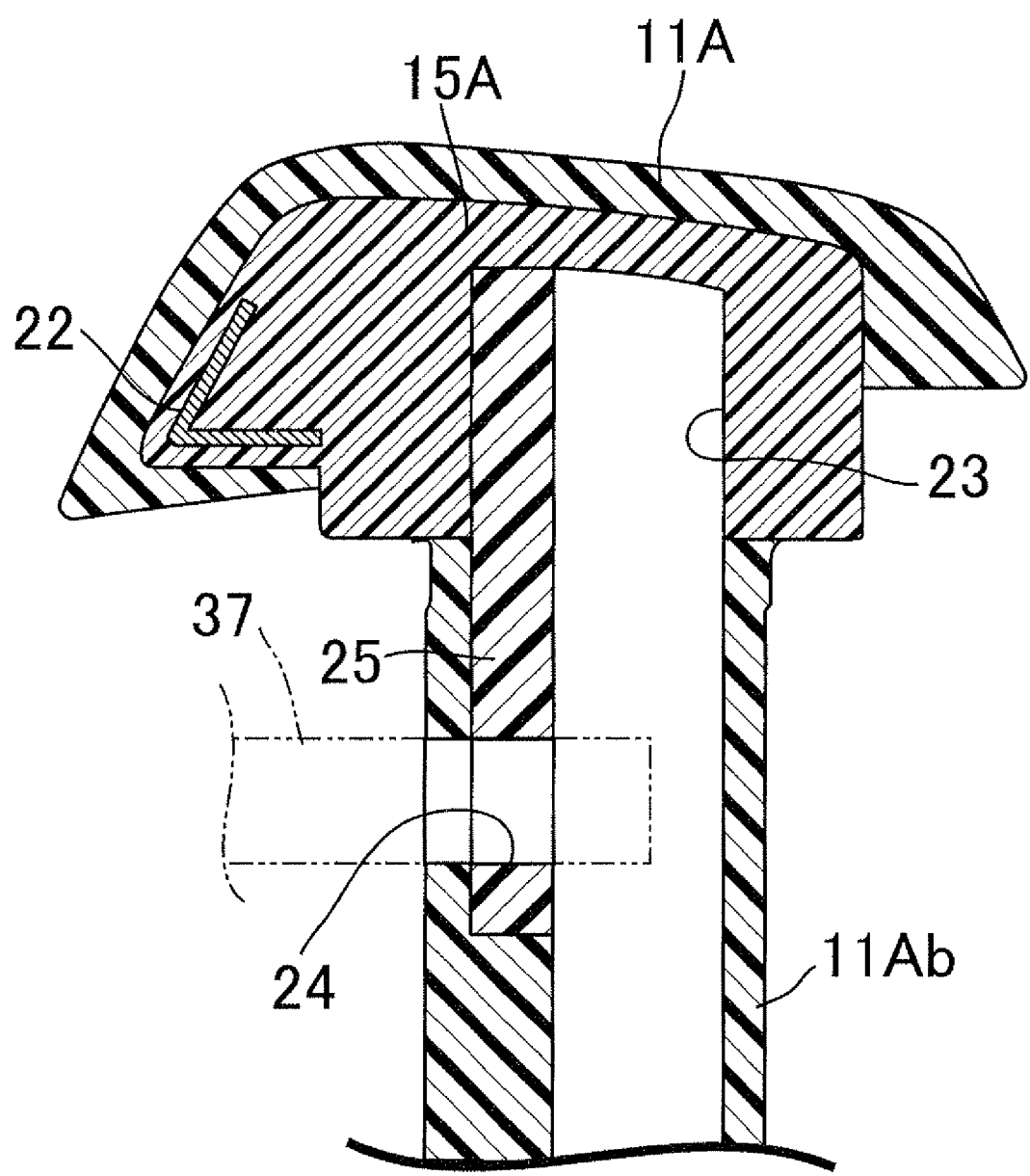

Referring also to FIG. 5, a lock sensor 22 for confirming an intension for unlocking the vehicular door by the access to or the contact with the operating handle 11A is embedded in an end of the holder 15A on the side of the operating arm portion 11Ab. The unlocking sensor is provided on the circuit board 13 so as to confirm the unlocking intension of the vehicle user when the user has grasped the lengthwise central portion of the operating handle 11A, and the lock sensor 22 is disposed at the end of the holder 15A on the side of the operating arm portion 11Ab spaced apart from the circuit board 13, so that the lock sensor 22 cannot erroneously detect the locking intension when the user has grasped the operating handle 11A.

At the end of the holder 15A on the side of the operating arm portion 11Ab are provided a positioning recess 23, which performs the positioning of the holder 15A, i.e., the protecting means 14A within a die device during molding of the operating handle 11A and a positioning projection 25, which has a positioning bore 24 and extends from the positioning recess 23 toward the operating arm potion 11Ab.

Figure 6:
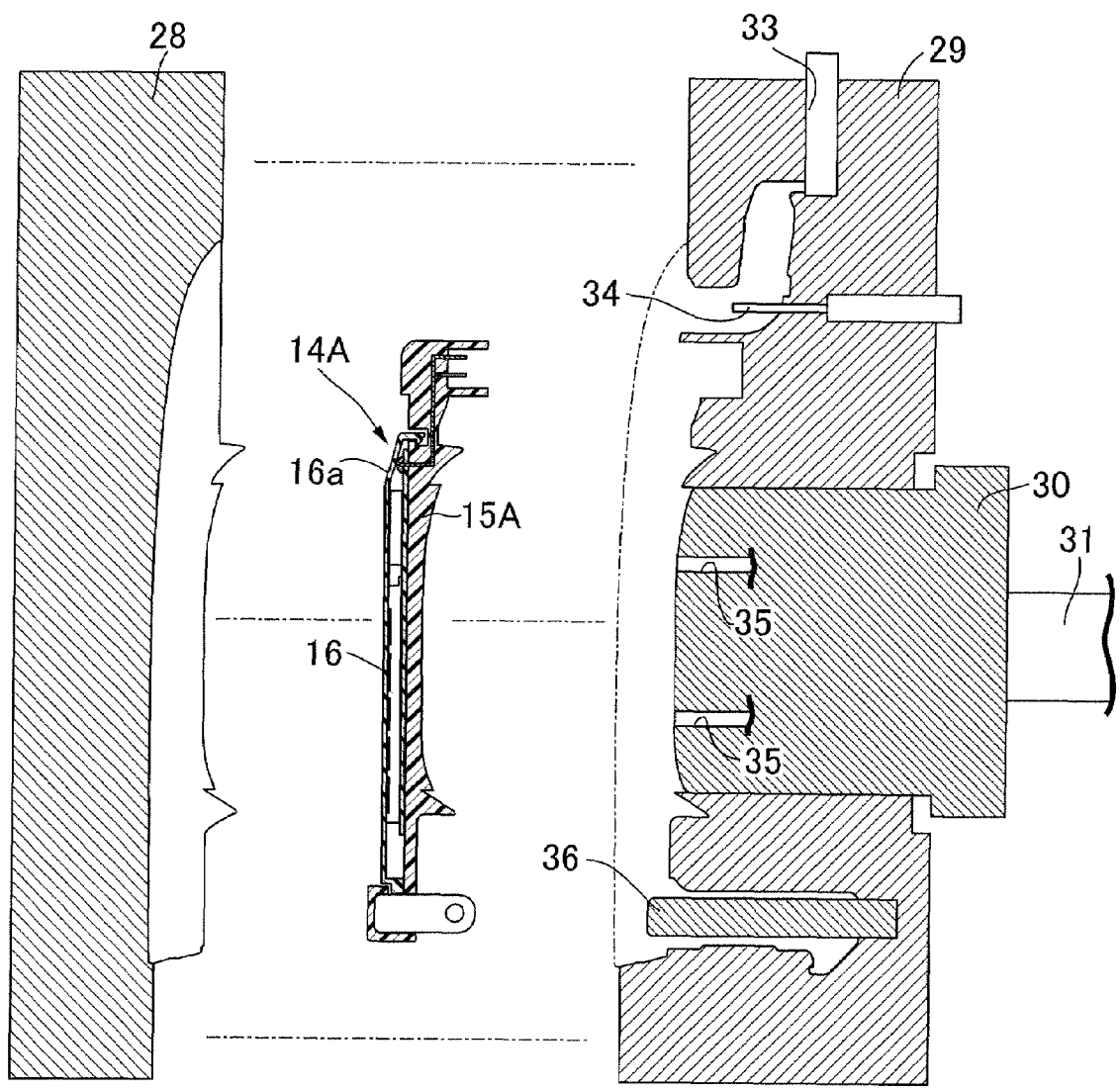

Referring to FIG. 6, a die device for die-formation of the operating handle 11A includes a stationary die 28, and a movable die 29 movable toward and away from the stationary die 28. The movable die 29 is comprised of a plurality of die portions or components in consideration of a contour shape of the operating handle 11A and the removal of the formed operating handle 11A from the movable die 29, but for convenience sake, the plurality of die portions or components constituting the movable die 29 are shown without discrimination from each other in FIGS. 6 to 8.

A positioning core 30 adapted to abut against the grip portion 15Aa of the holder 15A is provided for advancing and retracting movements in the movable die 29, so that it is connected to a rod 31 of a hydraulic cylinder (not shown). When the die device is in an opened state, the positioning core 30 is in a position slightly retracted from the movable die 29 around the positioning core 30. The movable die 29 is provided with a resin injection inlet 33 for injecting a molten synthetic resin into a cavity 32 (see FIGS. 7 and 8) formed between the stationary die 28 and the movable die 29, and a gas injection nozzle 34 for injecting a gas into the cavity 32.

The positioning core 30 is provided with a plurality of suction passages 35 opened on an abutment surface of the positioning core 30 adapted to abut against the grip portion 15A of the holder 15A, so that the holder 15A. i.e., the protecting means 14A is retained on the movable die 29 side by the evacuation through the suction passages 35 during die-formation of the operating handle 11A.

Further, a core 36 fitted into the positioning recess in the holder 15A, a pin 37 (see FIG. 5) fitted into the positioning bore and the like are disposed in the movable die 29.

Figure 7:
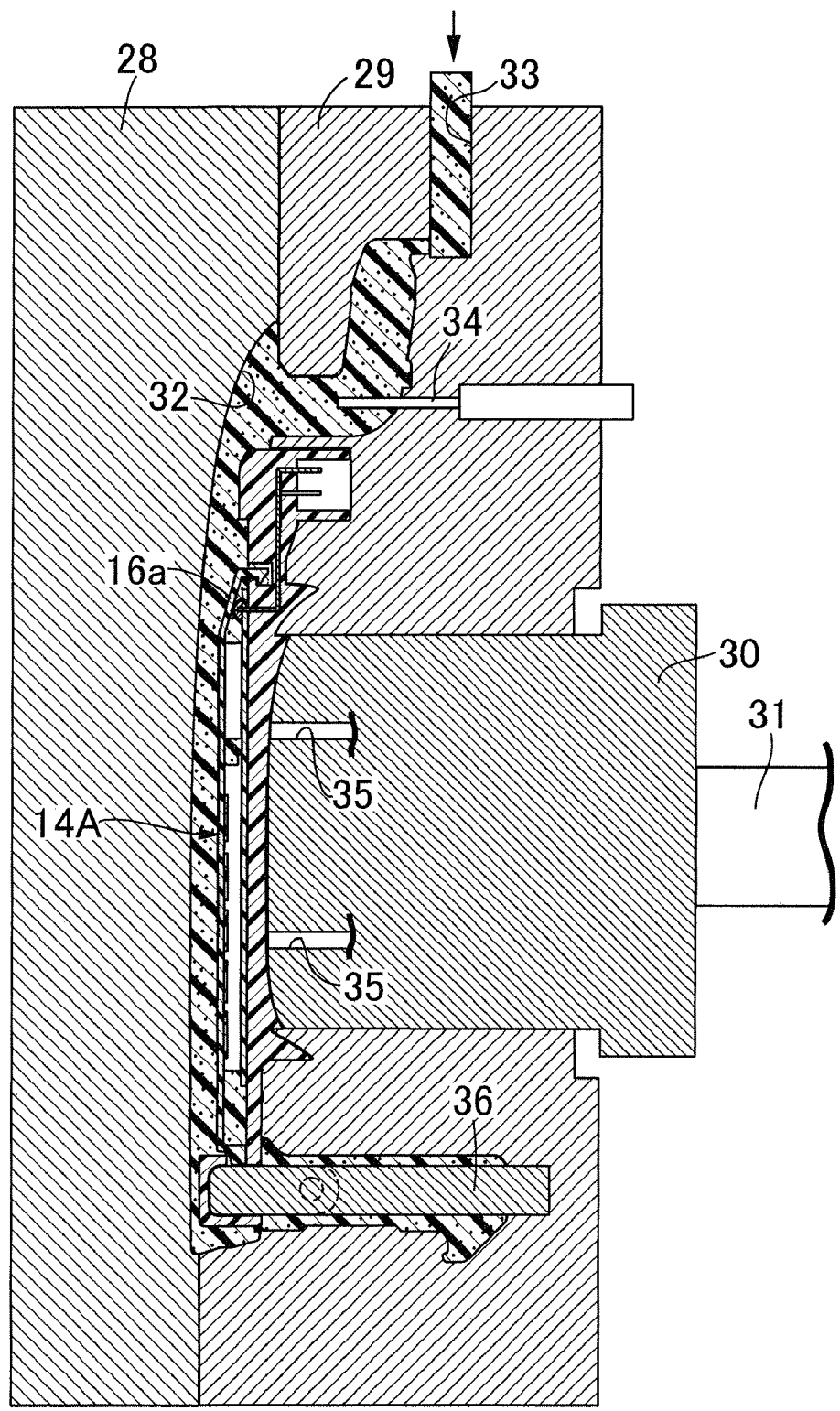

When the movable die 29 is moved toward the stationary die 28 in a state in which the protecting means 14A has been set in the movable die 29, as shown in FIG. 7, the cavity 32 corresponding to the contour shape of the operating handle 11A is formed between the stationary die 28 and the movable die 29, and the protecting means 14A is positioned and disposed in the cavity 32.

In this state, a molten resin is injected into the cavity 32 from the resin injecting inlet 33, and an amount of resin injected is set at a value smaller than an amount enough to fully fill the cavity 32 with the molten resin. During injection of the molten resin into the cavity 32, the grip portion 15Aa of the holder 15A adapted to form a portion of the outer surface of the operating handle 11A after completion of the die formation of the operating handle 11A is in a position retracted from the surface of the movable die 28 around the grip portion 15Aa facing the cavity 32. Thus, it is possible to prevent the molten resin from flowing into between the grip portion 15Aa and the positioning core 30, thereby providing an excellent appearance of the grip portion 15Aa after completion of the die-formation of the operating handle 11A.

During injection of the molten resin into the cavity 32, an end 16a of the holder cover 16 in the protecting means 14 on the side of the resin injecting inlet 33 is opposed to a direction of flowing of the resin within the cavity 32, but the opposed portion, i.e., the outer surface of the end 16a is formed into a streamline shape.

Figure 8:
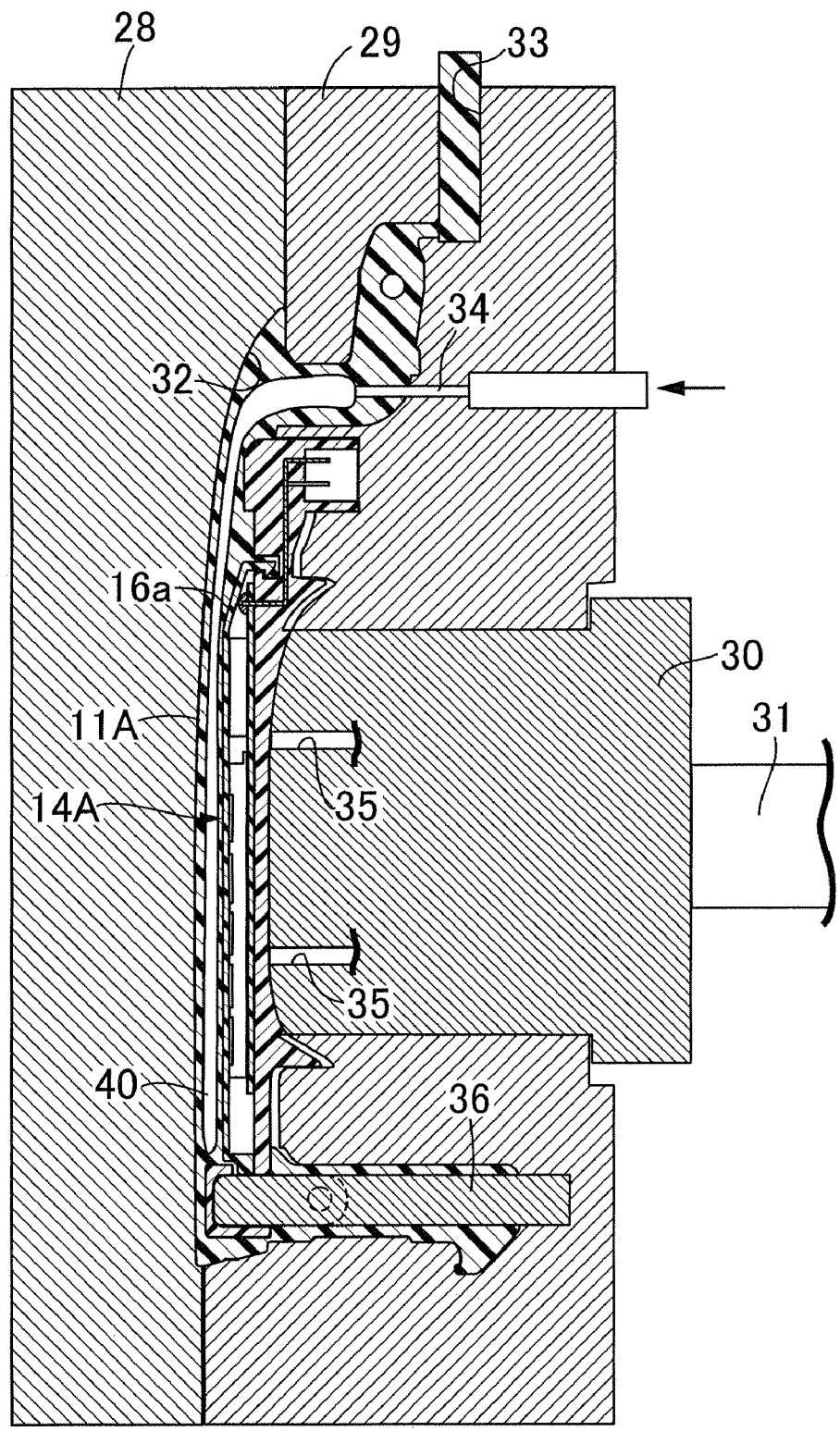

After completion of the injection of the molten resin, the positioning core 30 is advanced so that it is flush with the surface of the movable core 29 around the positioning core 30, which faces the cavity 32, as shown in FIG. 8. Further, a void 40 is formed within the operating handle 11A by injecting a gas from the gas injecting nozzle. The injection of the gas in this manner makes it possible to lower the temperature of the molten resin to suppress a heat influence to the circuit board 13 and to provide a reduction in weight of the operating handle 11A. Moreover, it is possible to prevent the generation of a sink mark on the outer surface of the operating handle 11A by thinning the wall thickness of the operating handle 11A.

After completion of the die-formation, the movable die 29 is moved away from the stationary die 28, and the completed operating handle 11A is removed from the movable die 29.

The operation of the first embodiment will be described below. The operating handle 11A is die-formed of the synthetic resin in such a manner that the protecting means 14A covering the circuit board 13 is mold-coupled to the operating handle 11A. Therefore, as compared with a conventional operating handle having a structure divided into a handle body and a cover, it is unnecessary to take a water-proofing countermeasure such as an adhesion and a filling of a potting agent and thus, it is possible to reduce the number of operating steps. In addition, a screw member or the like for coupling the two members is not required and hence, it is possible to reduce the number of parts. Further, the operating handle 11A is formed into an integral structure and hence, there is no division face, and it is possible to prevent the generation of an abnormal sound. Moreover, the circuit board 13 is covered with the protecting means 14A and hence, a heat generated during the die-formation using the synthetic resin cannot exert an adverse influence to the electric parts such as the antenna 12 and the unlocking sensor and to the circuit board 13.

In addition, the protecting means 14A comprises the holder 15A to which the circuit board 13 is fixed and whose outer surface opposite from the side on which the circuit board 13 is fixed is a portion of the outer surface of the operating handle 11A, and the holder cover 16 attached to the holder 15A to cover the circuit board 13, and the outer surface of the end 16a of the holder 16 opposed to the direction of flowing of the resin during the die-formation is formed into the streamline shape. Therefore, it is possible to smoothen the flowing the molten resin to suppress a load applied to the protecting means 14A to a smaller level, thereby preventing the deformation of the protecting means 14A.

Further, the terminals 21 electrically connected at one ends thereof to the circuit board 13 are embedded in the holder 15A in such a manner that the other ends protrude from the outer surface of the operating handle 11A after the die-formation of the operating handle 11A. Therefore, it is possible to facilitate the integral formation of the operating handle 11A, while enabling the electrical connection to the vehicle, and it is also possible to disuse a harness and a conductor wire to simplify the electrical connection to the vehicle side.

Figure 9:
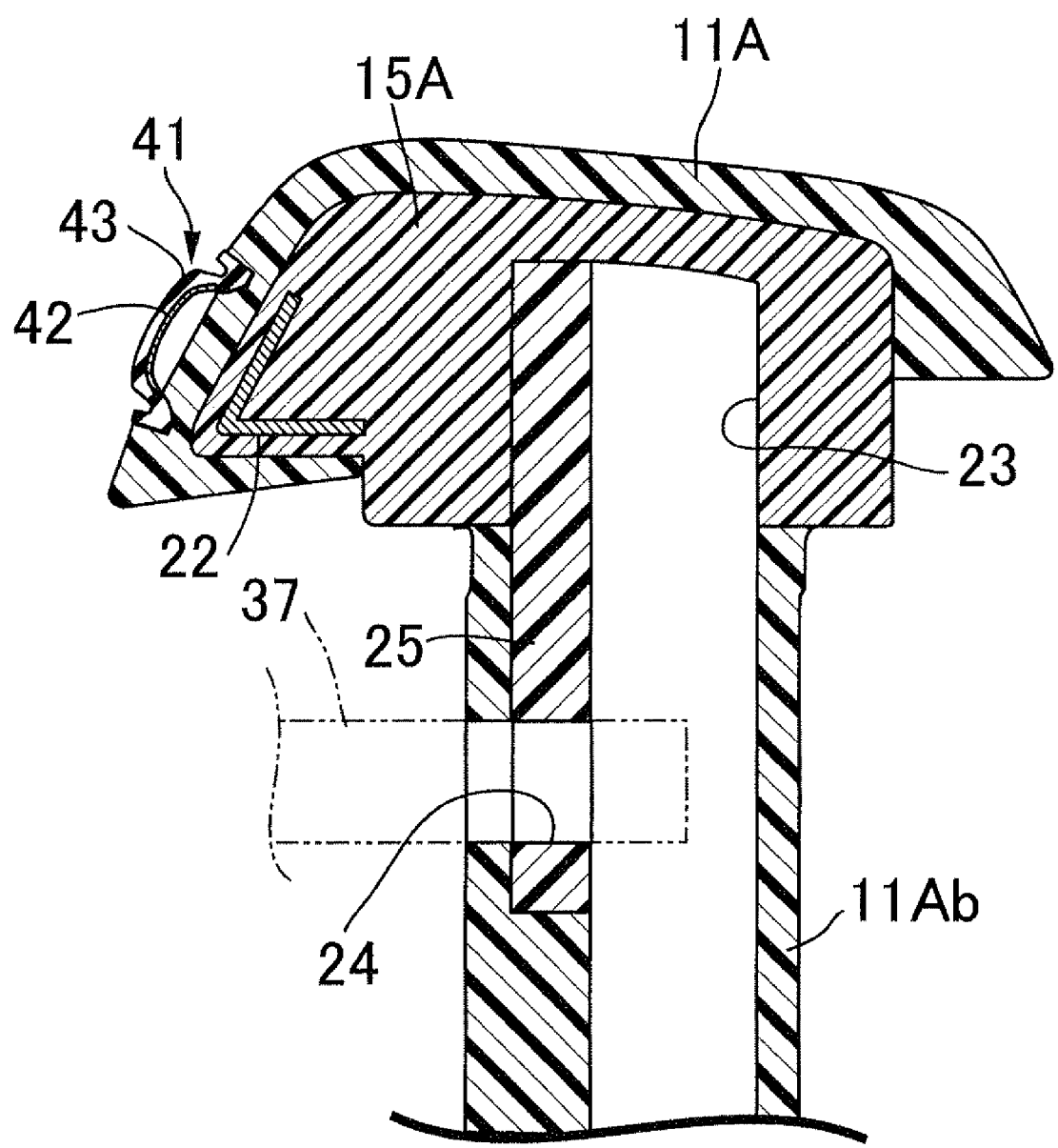
FIG. 9 is a sectional view similar to FIG. 5 but according to a second embodiment of the present invention.

In a second embodiment of the present invention, a button 41 for clearly indicating a locking intension may be attached to an operating handle 11A at a location corresponding to the locking sensor 22 embedded in the holder 15A, as shown in FIG. 9. The button 41 comprises a Belleville spring member 42 covered with a covering member 43 made of a synthetic resin, for example, in order to provide a click feeling. An outer peripheral portion of the button 41 is resiliently engaged with the operating handle 11A.

Figure 10:
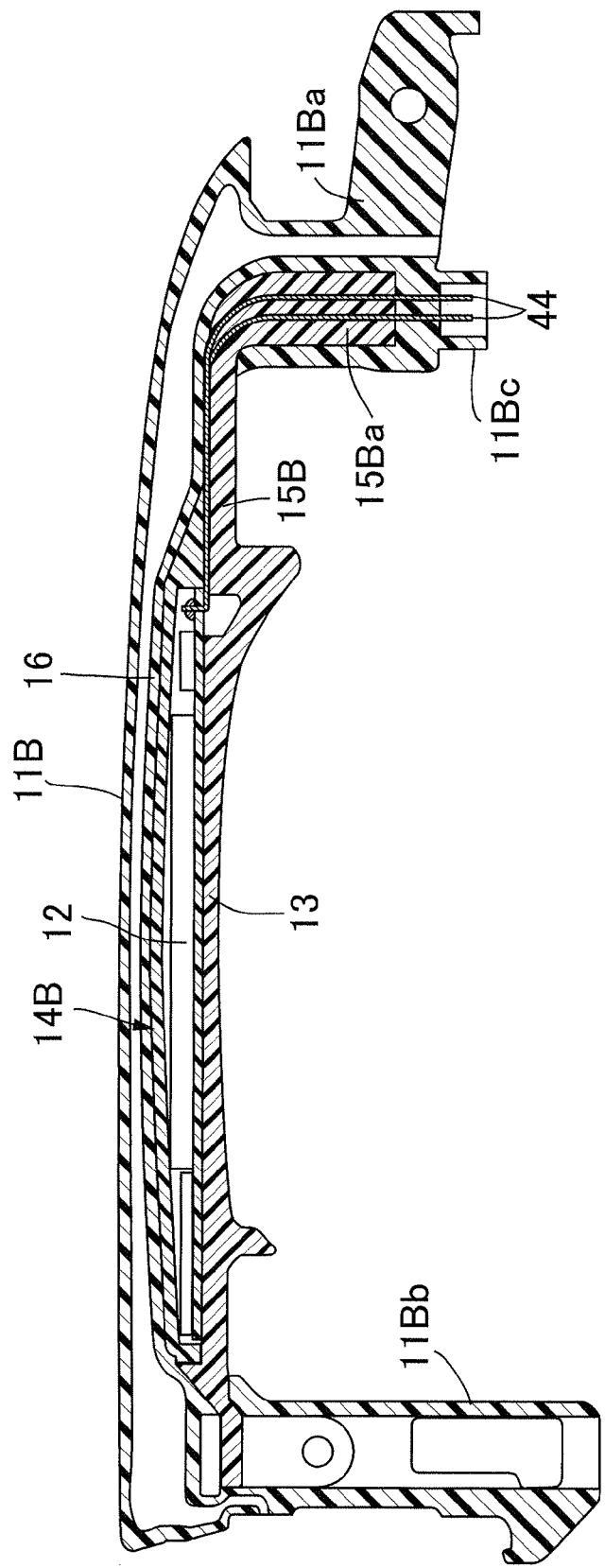
FIG. 10 is a sectional view similar to FIG. 3 but according to a third embodiment of the present invention.

FIG. 10 shows a third embodiment of the present invention. An operating handle 11B according to the third embodiment is disposed on an outer surface of a vehicular door (not shown) to extend in a front-back direction of the vehicle (in a left and right direction in FIGS. 1 to 3). The operating handle 11B is integrally provided at its lengthwise opposite ends with a substantially L-shaped support arm portion 11Ba and an operating arm portion 11Bb. The operating handle 11B is die-formed of a synthetic resin in such a manner that a protecting means 14B covering a circuit board 13 is mold-coupled to the operating handle 11B. The protecting means 14B comprises a holder 15B to which the circuit board 13 is fixed and whose outer surface opposite from a side on which the circuit board 13 is fixed is a portion of an outer surface of the operating handle 11B, and a holder cover 16 attached to the holder 15B to cover the circuit board 13.

The holder 15B is integrally provided with an extension 15Ba embedded in the support arm portion 11Ba of the operating handle 11B, and terminals 44 are embedded in the extension 15Ba with their one ends facing a coupler portion 11Bc integrally and projectingly provided on the support arm portion 11Bb. The other ends of the terminals 44 are electrically connected to the circuit board 13.

Even according to the third embodiment, an effect similar to that in the first embodiment can be provided.

Although the embodiments of the present invention have been described in detail, it will be understood that the present invention is not limited to the above-described embodiments, and various modifications in design maybe made without departing from the spirit and scope of the invention defined in claims.

What is claimed is:

1. A vehicle outer handle system comprising a circuit board including an electric part, the circuit board being accommodated in an operating handle, wherein said operating handle is die-formed of a synthetic resin in such a manner that a protecting means covering said circuit board is mold-coupled to said operating handle,
    wherein said protecting means comprises a holder to which said circuit board is fixed and whose outer surface opposite from a side on which said circuit board is fixed is a portion of an outer surface of said operating handle, and a holder cover attached to said holder to cover said circuit board, and an outer surface of said cover holder is formed into a streamline shape in a region opposed to the direction of flowing of the resin during die-formation.

2. A vehicle outer handle system according to claim 1, wherein terminals electrically connected to said circuit board are embedded in said holder in such a manner that one end thereof protrudes from the outer surface of said operating handle after the die-formation of the operating handle.

* * * * *